United States Patent [19]
Silverbrook

[11] Patent Number: 5,606,652
[45] Date of Patent: Feb. 25, 1997

[54] REAL-TIME PROCESSING SYSTEM FOR ANIMATION IMAGES TO BE DISPLAYED ON HIGH DEFINITION TELEVISION SYSTEMS

[75] Inventor: Kia Silverbrook, Woollahra, Australia

[73] Assignees: Canon Kabushiki Kaisha, Japan; Canon Information Systems Research Australia Pty Limited, Australia

[21] Appl. No.: 53,216

[22] Filed: Apr. 28, 1993

[30] Foreign Application Priority Data

Apr. 29, 1992 [AU] Australia .................................. PL 2146

[51] Int. Cl.⁶ ..................................................... G06T 1/00
[52] U.S. Cl. ........................... 395/135; 395/173; 395/501
[58] Field of Search ........................... 395/133, 135–139, 395/141, 147, 152, 153, 154, 155, 161, 162–164; 348/426, 429, 578, 584

[56] References Cited

U.S. PATENT DOCUMENTS 5,353,404  10/1994  Abe et al. ................................. 395/164
5,455,902  10/1995  Ellson et al. ............................. 395/152

*Primary Examiner*—Almis R. Jankus
*Attorney, Agent, or Firm*—Fitzpatrick, Cella, Harper & Scinto

[57] ABSTRACT

A real-time interactive entertainment device includes a host processor for controlling the operation of the device, a communicating device for receiving object based image data, and a real-time object (RTO) processor connected to the communication device for generating alterable animation image data based upon received object based image data and/or data stored within the device. The real-time object processor generates animation image data at a rate suitable for display in a HDTV system, and generates HDTV signals from the animated image data.

21 Claims, 4 Drawing Sheets

REAL-TIME PROCESSING SYSTEM FOR ANIMATION IMAGES TO BE DISPLAYED ON HIGH DEFINITION TELEVISION SYSTEMS

BACKGROUND

1. Field of the Invention

The present invention relates to video animation and, in particular, discloses a real-time HDTV animation system.

2. Description of the Related Art

In recent years there have been moves to produce higher definition television (HDTV) systems for consumer and other markets. At present a number of different standards exist for high definition television, with all these standards relying on an increased display resolution to produce improved image quality.

SUMMARY OF THE INVENTION

The present invention relates to the incorporation of real-time interactive animation into a HDTV product.

In accordance with one aspect of the present invention there is disclosed a real-time interactive entertainment device having:

a host processor for controlling the operation of the interactive entertainment device, a communication device for receiving object based image data, a real-time object (RTO) processor connected to the communicating for generating alterable animation image data based upon said received object based image data and/or data stored within the interactive entertainment device. The RTO processor generates the animation image data at a rate suitable for display in a HDTV system, and an extractor connected to said RTO processor for generates HDTV signals from the animation image data.

Also disclosed is an HDTV apparatus including the above real-time entertainment device.

BRIEF DESCRIPTION OF THE DRAWINGS

A preferred embodiment of the present invention will now be described with reference to the drawings in which.

DETAILED DESCRIPTION OF THE PREFERRED EMBODIMENT

The present invention relates to the specific application of real-time object technology disclosed in the following patent specifications and the disclosure of each of which is hereby incorporated by cross-reference:

U.S. patent application Ser. No. 08/053,373, filed Apr. 28, 1993, entitled "A Real-Time Object Based Graphics System", claiming priority from Australian Patent Application No. Pl2147, filed Apr. 29, 1992; U.S. patent application Ser. No. 08/053,212, filed Apr. 28, 1993, entitled "Method and Apparatus for Filling an Object Based Rasterised Image", claiming priority from Australian Patent Application No. Pl2148, filed Apr. 29, 1992; U.S. patent application Ser. No. 08/053,214, filed Apr. 28, 1993, entitled "Method and Apparatus for Providing Transparency in an Object Based Rasterised Image", claiming priority from Australian Patent Application No. PL2153, filed Apr. 29, 1992; U.S. patent application Ser. No. 08/053,365, filed Apr. 28, 1993, entitled "Object Sorting and Edge Calculation for Graphics Systems", claiming priority from Australian Patent Application Nos. PL2156 and PL2145, both filed Apr. 29, 1992; U.S. patent application Ser. No. 08/053,378, filed Apr. 28, 1993, entitled "A Preprocessing Pipeline for RTO Graphics System", claiming priority from Australian Patent Application No. PL2142, filed Apr. 29, 1992; U.S. patent application Ser. No. 08/053,219, filed Apr. 28, 1993, entitled "Object Based Graphics Using Quadratic Polynomial Fragments", claiming priority from Australian Patent Application No. Pl2150, filed Apr. 29, 1992; and U.S. patent application Ser. No. 08/053,213, filed Apr. 28, 1993, entitled "Bezier Spline to Quadratic Polynomial Fragment Conversion", claiming priority from Australian Patent Application No. PL2149, filed Apr. 29, 1992.

Figure 1:
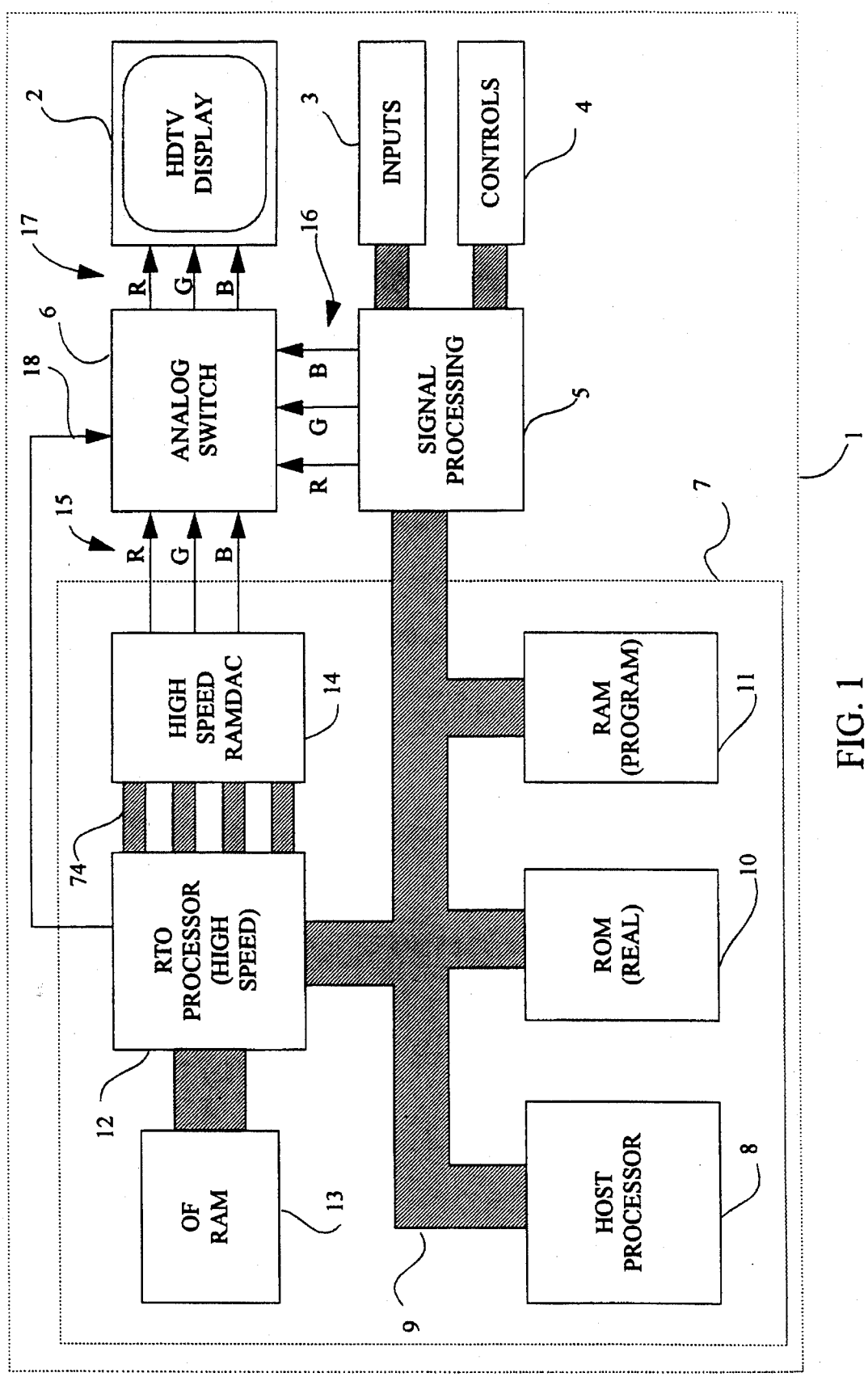
FIG. 1 is a schematic block diagram of the preferred embodiment when configured within an HDTV set.

As seen in FIG. 1, an HDTV receiver or set 1 (generally intended for use in consumer markets) includes standard HDTV components such as a display 2, and an array of inputs 3 such as an RF receiver and/or an ISDN connection. A series of controls 4 such as a keyboard or remote control facility is also provided in the usual manner. The inputs 3 and controls 4 each connect to a signal processing unit 5 which permits demodulation and forming of a video signal 16 which is output in RGB format, for example in accordance with CCIR 601 standards. The RBG signal 16 is input to an analogue switch unit 6 which selects between the HDTV RGB image 17 and a real-time animation image 15 under the control of a real-time animated key signal 18.

Also shown in FIG. 1 is an interactive animation system 7 which permits real-time image generation in accordance with the teachings of the foregoing cross-referenced patent specifications.

The system 7 includes a host processor 8 which is generally a low cost 32-bit processor having a 16-bit bus 9. The processor 8 is required to operate at approximately 5 MIPs and a suitable device is the i960SA manufactured by Intel Corp. Other similar processors can also be used, as can higher performance processors with full 32-bit buses, and other general purpose micro-processors. The bus 9 connects to the signal processing unit 5 which permits the system 7 to be used to control the standard HDTV decoding functions. Also connected to the bus 9 is a ROM device 10 which includes a language interpreter for an animation language used to control the operation of the system 7. Furthermore, included within the ROM 10 can be a range of outline fonts suitably formatted for use in the system 7.

Also connected to the bus 9 is RAM 11 which acts as a general purpose memory for the host processor 8 and is used for the generation of display lists of graphics objects to be rendered by the system 7.

The host processor 8 acts to generate display list information which is read and interpreted by an RTO processor 12 also connected to the bus 9. The RTO processor 12 is a high speed version of the device specifically disclosed in U.S. patent application Ser. No. 08/053,373 referred to above, which permits the real-time rendering of video animation at HDTV rates. Connected to the RTO processor 12 and used for this purpose is an OF (object fragment) RAM 13 which is generally configured for the storage of quadratic polynomial fragments (QPF's) for which the RTO processor 12 is configured to utilise. The object fragments represent outline curve portions of graphic objects and permit fast image calculation and rendering. To achieve high speed operation, the RTO processor 12 is configured as a custom integrated circuit device utilising about 300,000 transistors and is capable of generating animation at rates of about 100 million pixels per second. Alternatively the RTO processor 12 can be modelled on that described in the above disclosed specification with each processing step operating at approximately the same speed and utilizating of four parallel processing stages as described below in the final stages of the RTO processor 12.

The RTO processor 12 outputs animated image data to a RAMDAC 14 which represents a colour look-up table which can take a four way demultiplexed input 36 and can assign any of approximately 16 million colours to the animation objects output from the RTO processor 12. The RAMDAC 14 converts the colours into analogue RGB signals 15. A suitable RAMDAC 14 which includes 4:1 multiplexed inputs is, for example the Inmos G300 or the Brooktree BT458.

The RAMDAC 14 is only required if the HDTV 1 is configured for the display of analogue signals. If digital signals can be displayed, there is no requirement for the RAMDAC 14 and a colour look-up table (CLUT) is used. In this case, the analog switch 6 is replaced with a digital multiplexer.

The provision of the interactive animation system 7 into the HDTV set 1 affords a number of advantages not generally available. This includes the ability of interactive animation in which interactive computer games can be down loaded from an ISDN line and played on the HDTV set 1. Furthermore, for example, periodicals such as magazines can be produced electronically and made available as ISDN services. Using a standard 64 KiloBit ISDN line, an entire magazine can be transferred for display in approximately one minute. Furthermore, the system 7 can be used for connection to a CDROM which can provide input of graphic objects for animation purposes. Connection to TELETEXT (Registered Trade Mark) services can also be provided as the host processor 8 is not necessarily required exclusively for real-time animation generation.

The system 7 provides high quality animated text and graphics including smooth motion, smooth curves and smooth colour transitions. All animations are calculated and displayed at the field rate of the HDTV system (60 images per second for Japanese standard analogue HDTV). This is significant improvement over standard animation rate for film animation (24 frames per second) and results in greater fluidity of motion thus reducing flicker and strobing effects.

Images are generated to the full HDTV resolution, with a pixel rate of 100 MegaPixels per second or more depending upon the standard for the HDTV being used.

The RTO processor 12 operates to provide an animation complexity of up to 8,000 curves in real-time. This is sufficient to animate approximately 300 text characters, or approximately 20 objects having a complexity of a typical animated cartoon character. Because all animations are object based, the size of each image can be varied either through enlargement or reduction without any significant loss of quality.

The system 7 has a colour palette of 16.7 million colours, allowing continuous tone colour washes, and subtle colour variations. There is generally a limitation of 256 colours or colour washes on any one line of the display 2 at any one time.

Objects can also appear transparent. This is especially useful for animating shadows (transparent black) or it can also be used for other transparent effects such as ghosts, rain, reflections, and filters. Transparency can also be used to implement motion blur for very fast moving objects.

The length of an animation is not limited. The amount of animation that can be stored in the system 7, and the data rate required for on-line animation, depends upon the complexity of animated changes and the number of new graphic elements introduced during the animation.

The specific advantages achieved using the configuration of FIG. 1 is that the use of the RTO processor 12 eliminates the need for two video frame stores which are usually required for animation. The RTO processor 12 is able to generate in excess of 100 million pixels per second from object level data and can animate and render 480,000 curves per second to HDTV resolution. This permits a real-time animation complexity of about 8,000 curves per image, with 60 images per second.

Figure 2:
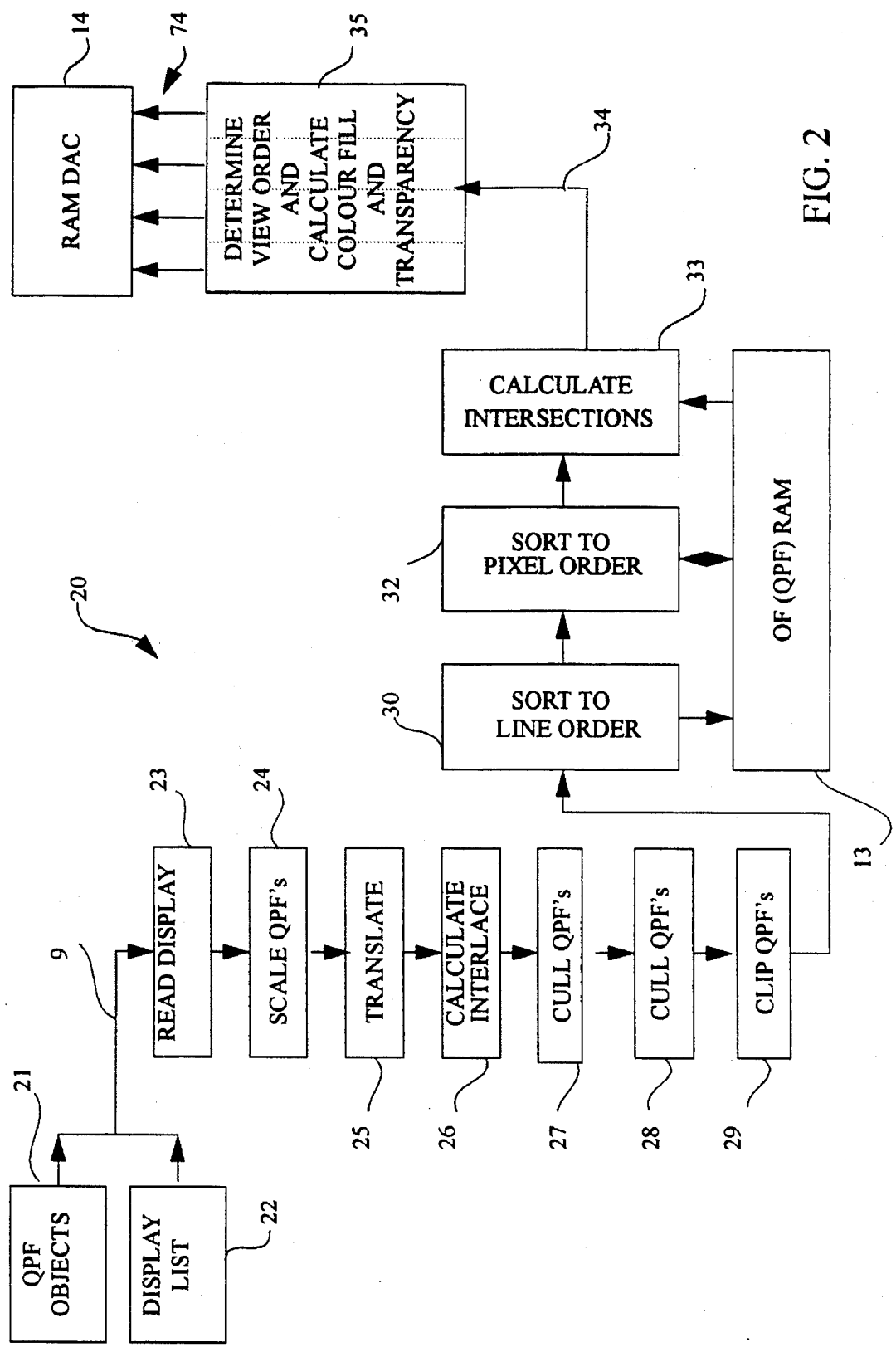
FIG. 2 is a data flow diagram of the RTO processor of FIG. 1.

Referring to FIG. 2, the data flow diagram 20 is shown for the generation of real-time animated images. To produce real-time animation, the host processor 8 creates a list of pointers to QPF objects, along with the desired size, position, colour and special effects for that object. Typical QPF objects are text characters in outline format, pans of animated characters, such as mouths, bodies and so forth, or background objects. The actual QPF objects can be selected from objects in the ROM 10 and formed as a display list 22 in the RAM 11.

The first operation performed by the RTO processor 12 is read from the display list 23 in which the RTO processor 12 accesses the display list 22 in the RAM 11. This is done using direct memory access. After reading, the QPF's are sealed 24 and translated 25. The QPF objects are scaled independently in each of the x and y directions which permits squash and stretch effects, as well as compensating for different pixel aspect ratios used in different television systems. The objects are also translated in x and y co-ordinates to reposition the object in the viewing area. The next portion of the data path 20 is interlace correction 26 where the QPF's are compensated for interlaced display, as the calculation of curves is different for odd and even fields.

It is then required to cull or remove those QPF's which are not required. QPF's that no longer form pan of the image are culled off screen 27. Also, QPF's which have been scaled too small 28 are removed. QPF's which cross boundaries of the screen are clipped 29 so that only those QPF portions which are specifically displayed on the screen are processed. All of the QPF's are sorted firstly by line order 30, and next by pixel order 32 within each line. To perform these functions, the QPF's are stored in an object fragment RAM 13 preferably peripheral to, but dedicated to the RTO processor 12. The calculation of intersections 33 of the QPF's is then determined.

Next in the data flow diagram 20 is the determining of the viewing order and the calculation of the colour fill and transparency 35. It is determined which objects in the image overlie each other and thus hidden surfaces are removed. As mentioned previously, the pixel rate of approximately 100 MPixels per second is required in order to sustain standard HDTV rates. In order to achieve the high rate required while not excessively increasing the expense of the implementation technology, four like systems operating in parallel can be used thereby reducing the required pixel production rate to approximately 25 MPixels per second. After the hidden surfaces are removed, visible ordering of objects is determined which implements the filling of colours.

This is performed in real-time so that no frame store is required, using the four like systems operating in parallel is required so as to increase performance and maintain image and animation capability at video rates corresponding to the standard video RTO processor described in U.S. patent application Ser. No. 08/053,373.

Figure 3:
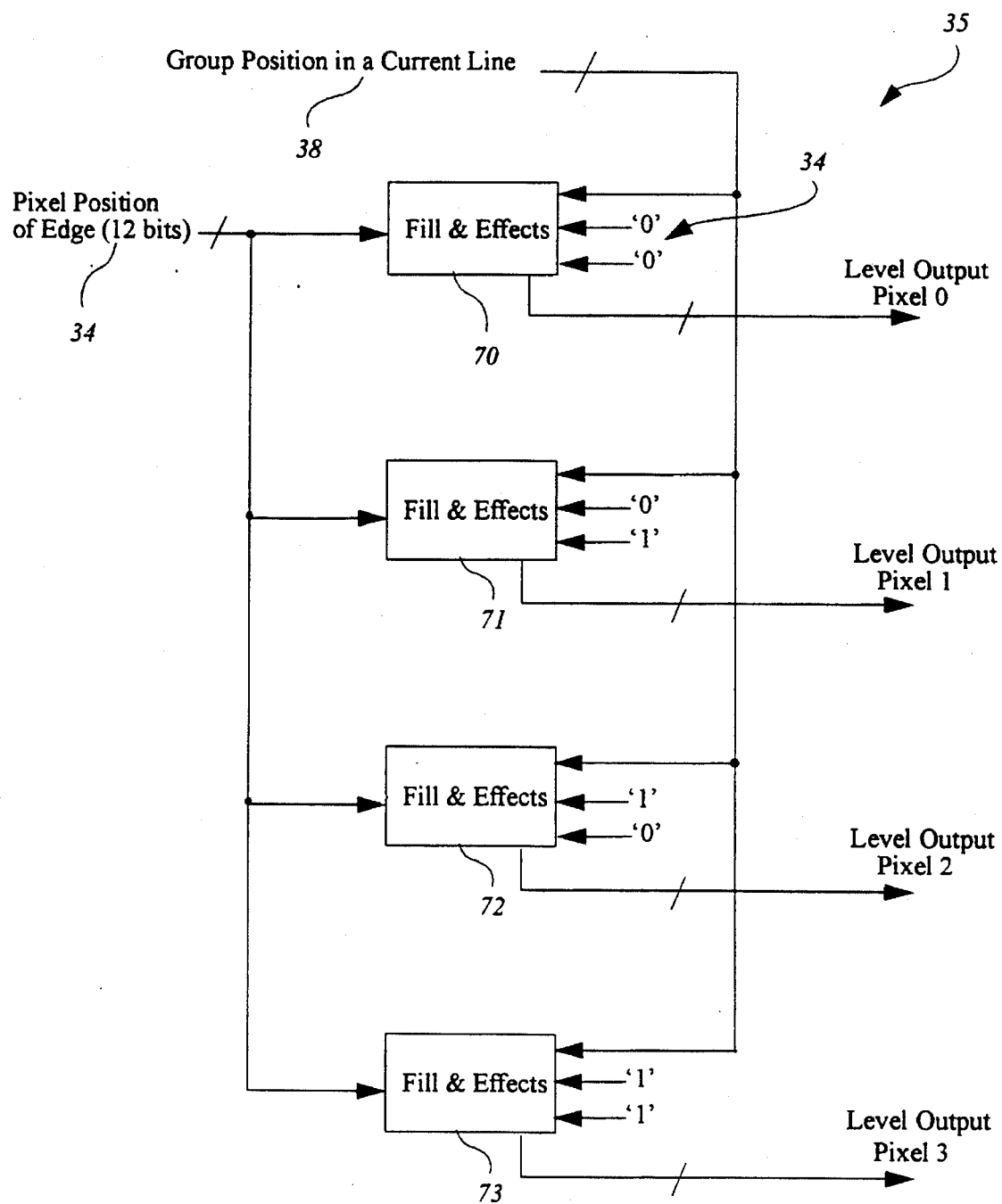
FIG. 3 is a schematic block diagram of a portion of the RTO processor of FIG. 1.

Referring now to FIG. 3, there is shown in more detail the device 35 used to implement the determination of view order and calculation of colour fill and transparency 35. This is achieved by grouping together pixels on a line into groups of four and thereby reducing the clock rate by four. This is achieved by discarding the lower two bits of a pixel position in a current line thereby forming a group position value 38. The pixel position of edges 34 is forwarded to a series of fill and effects units 70, 71, 72, 73. The fill and effects units calculate corresponding pixel level outputs 74 which are forwarded to RAMDAC 14 and used to index the appropriate colour table to determine a final output colour value.

The actual address of each pixel position in the group of four is formed by taking the original group position 38 and recreating the lower two bits by means of hardwired inputs, for example 75.

Figure 4:
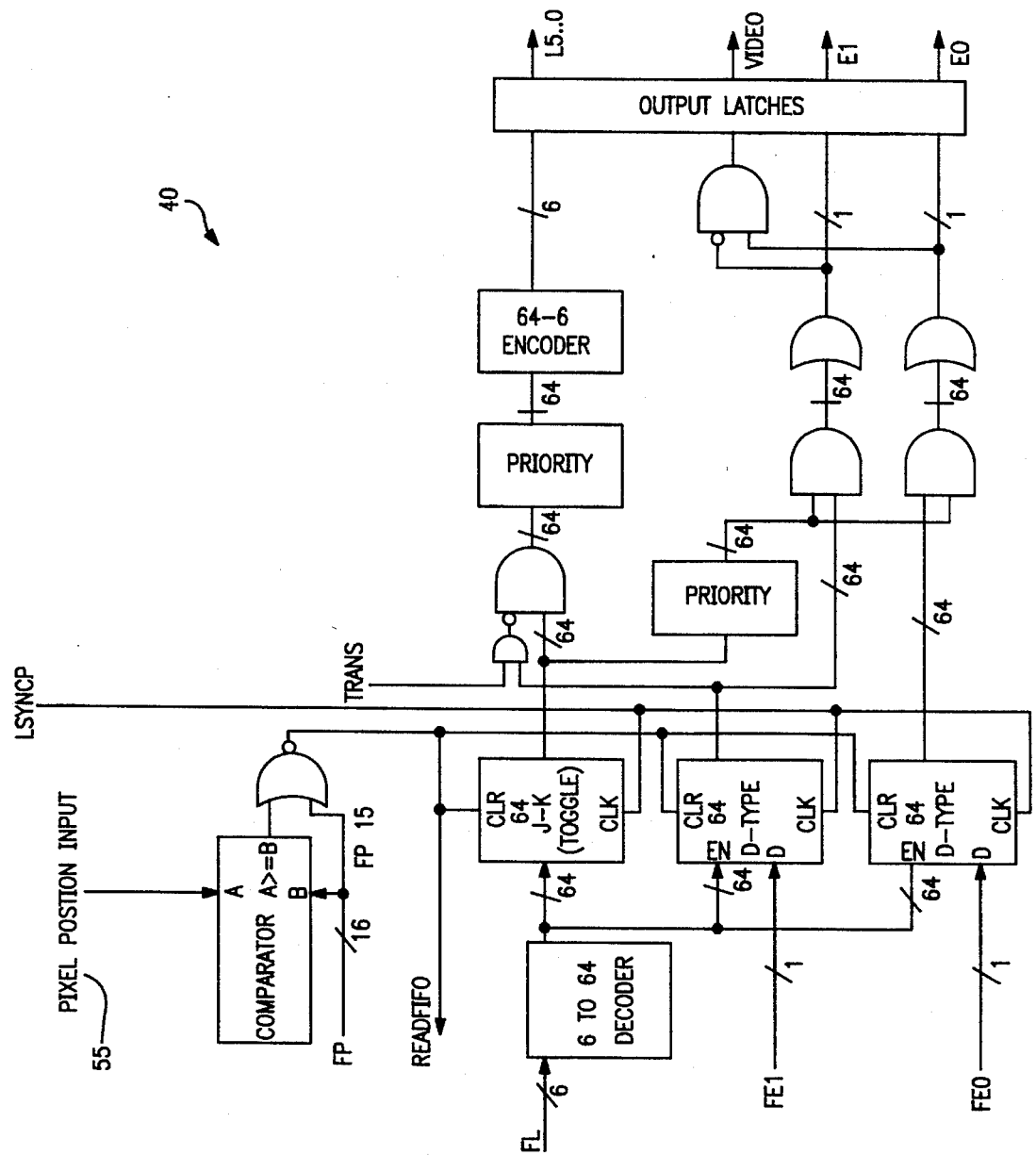
FIG. 4 is a schematic block diagram of the fill and effects unit of FIG. 3.

Referring now to FIG. 4, there is shown a generic example of the preferred embodiment of a fill and effects unit 40. This unit operates in substantially the same manner as that described in the U.S. patent application Ser. No. 08/053,214, the disclosure of which has been previously incorporated by reference. The group position value 38 and hardwired inputs 34 of FIG. 3 together form the current pixel position input 55.

The fill and effects unit 40 is responsible for determining which objects in the image overlie each other and thus hidden surfaces are removed. After the hidden surfaces are removed, visible ordering of objects is determined which implements the filling of colours Finally, object transparency and video effects are determined.

Returning now to FIG. 2 and FIG. 3, the dam is output from the RTO processor 12 to the RAMDAC 14 as four interleaved pixel streams at 25 MHz each. The RAMDAC 14 multiplexes these into a single 100 MHz pixel stream for HDTV operation.

Because the clock rate of the RTO processor 12 is kept low (about 25 MHz), no high speed outputs are required and standard PCB construction techniques can be used. Also, faster operation can be readily achieved if required.

The foregoing describes only one embodiment of the present invention and modifications, obvious to those skilled in the art, can be made thereto without departing from the scope of the present invention.

I claim:

1. A real-time interactive entertainment device comprising:

communication means for receiving object-based data;

a host processor for controlling the operation of said device and for generating display list information incorporating said received object-based image data and object-based image data stored within said device;

a real-time object processor connected to said host processor for rendering in real-time animation image data from said object-based image data in said display list information, said real-time object processor rendering said animation image data in a rasterized display order and at a rate sufficient for display in a high-definition television (HDTV) system; and generating means connected to said real-time object processor for generating HDTV signals from said animated image data.

2. A real-time interactive entertainment device as claimed in claim 1 wherein said real-time object processor means generates said animation image data at a pixel level and a multiplicity of pixels are generated simultaneously.

3. A real-time interactive entertainment device as claimed in claim 1 wherein the viewing order of said object based image data corresponds to said multiplicity of pixels generated simultaneously.

4. A real-time interactive entertainment device as claimed in claim 1 wherein a colour fill value of said object-based image data corresponds to said multiplicity of pixels generated simultaneously.

5. A real-time interactive entertainment device as claimed in claim 1 wherein a transparency value of said object-based image data corresponds to said multiplicity of pixels generated simultaneously.

6. A real-time interactive entertainment device as claimed in claim 1 wherein said object based image data comprises quadratic polynomial fragments.

7. A real-time interactive entertainment device as claimed in claim 1 wherein said real-time object processor includes scaling means for scaling said object based image data.

8. A real-time interactive entertainment device as claimed in claim 1 wherein said real-time object processor includes translation means for translating said object based image data.

9. A real-time interactive entertainment device as claimed in claim 1 wherein said real-time object processor includes interlace correction means for correcting said object based image data for an interlaced display.

10. A real-time interactive entertainment device as claimed in claim 1 wherein said real-time object processor includes image culling means adapted to remove those portions of said object based image data that do not form part of an image to be displayed.

11. A real-time interactive entertainment device as claimed in claim 1 wherein said real-time object processor includes image clipping means adapted to recalculate those portions of said object based image data that only partially form part of the image to be displayed.

12. A real-time interactive entertainment device as claimed in claim 1 wherein said real-time object processor includes object fragment line sorting means adapted to sort portions of said object based image data by a starting line.

13. A real-time interactive entertainment device as claimed in claim 1 wherein said real-time object processor includes object fragment pixel sorting means adapted to sort portions of said object based image data by a starting pixel.

14. A real-time interactive entertainment device as claimed in claim 1 wherein said generating means comprises a RAMDAC device connected to receive said animation image data and to output pixel data to a display.

15. A real-time interactive entertainment device as claimed in claim 1 wherein said communications means includes an ISDN communications means.

16. A real-time interactive entertainment device as claimed in claim 1, further comprising an object fragment store associated with said real-time object processor and using which said real-time object processor sorts portions of said object-based image data prior to directly rendering said object-based image data to a pixel level without the use of a pixel-based image store.

17. A real-time interactive entertainment device comprising:

communication means for receiving object-based image data;

a host processor for controlling the operation of said device and for generating display list information incorporating said received object-based image data and object-based image data stored within said device;

a real-time object processor connected to said host processor for rendering in real-time animation image data from said object-based image data in said display list information, said real-time object processor rendering said animation image data at a pixel level, and a multiplicity of pixels are generated simultaneously at a rate sufficient for display in a high-definition television (HDTV) system; and generating means connected to said real-time object processor for generating HDTV signals from said animated image data.

18. A real-time interactive entertainment device as claimed in claim 17, wherein the viewing order of said object based image data corresponds to said multiplicity of pixels generated simultaneously.

19. A real-time interactive entertainment device as claimed in claim 17, wherein a color fill value of said object-based image data corresponds to said multiplicity of pixels generated simultaneously.

20. A real-time interactive entertainment device as claimed in claim 17, wherein a transparency value of said object-based image data corresponds to said multiplicity of pixels generated simultaneously.

21. A real-time interactive entertainment device as claimed in claim 17, further comprising an object fragment store associated with said real-time object processor and using which said real-time object processor sorts portions of said object-based image data prior to directly rendering said object-based image data to a pixel level without the use of a pixel-based image store.

\* \* \* \* \*

UNITED STATES PATENT AND TRADEMARK OFFICE
CERTIFICATE OF CORRECTION

PATENT NO. : 5,606,652
DATED : February 25, 1997
INVENTOR(S) : Kia Silverbrook

It is certified that error appears in the above-indentified patent and that said Letters Patent is hereby corrected as shown below:

```
      Column 1, line 31, change "communicating" to
--communicating device--.
```

Signed and Sealed this

Eighth Day of July, 1997

Attest:

BRUCE LEHMAN

Attesting Officer

Commissioner of Patents and Trademarks